United States Patent
Son et al.

(10) Patent No.: US 9,718,958 B2
(45) Date of Patent: Aug. 1, 2017

(54) COPOLYCARBONATE AND COMPOSITION CONTAINING THE SAME

(71) Applicant: LG CHEM, LTD., Seoul (KR)

(72) Inventors: Young Wook Son, Daejeon (KR); Moo Ho Hong, Daejeon (KR); Ki Jae Lee, Daejeon (KR); Jung Jun Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/026,565

(22) PCT Filed: Dec. 4, 2015

(86) PCT No.: PCT/KR2015/013246
§ 371 (c)(1),
(2) Date: Mar. 31, 2016

(87) PCT Pub. No.: WO2016/089171
PCT Pub. Date: Jun. 9, 2016

(65) Prior Publication Data
US 2016/0326313 A1     Nov. 10, 2016

(30) Foreign Application Priority Data

Dec. 4, 2014   (KR) .................. 10-2014-0173005
Dec. 3, 2015   (KR) .................. 10-2015-0171768

(51) Int. Cl.
| | |
|---|---|
| C08L 69/00 | (2006.01) |
| C08G 64/18 | (2006.01) |
| C08G 77/448 | (2006.01) |
| C08G 64/38 | (2006.01) |
| C08J 5/00 | (2006.01) |

(Continued)

(52) U.S. Cl.
CPC .............. *C08L 69/00* (2013.01); *C08G 64/06* (2013.01); *C08G 64/085* (2013.01); *C08G 64/1666* (2013.01); *C08G 64/1691* (2013.01); *C08G 64/18* (2013.01); *C08G 64/186* (2013.01); *C08G 64/307* (2013.01); *C08G 64/38* (2013.01); *C08G 77/448* (2013.01); *C08J 5/00* (2013.01); *C08K 5/3475* (2013.01); *C08L 69/005* (2013.01); *C08L 83/04* (2013.01);

(Continued)

(58) Field of Classification Search
CPC ... C08G 77/448; C08G 77/445; C08G 64/186
See application file for complete search history.

(56) References Cited

U.S. PATENT DOCUMENTS 3,819,744 A    6/1974  Buechner et al.
5,324,454 A    6/1994  Takata et al.

(Continued)

FOREIGN PATENT DOCUMENTS

| CN | 101124282 A | 2/2008 |
|---|---|---|
| CN | 101585961 A | 11/2009 |

(Continued)

OTHER PUBLICATIONS

Hwang, et al.: "Production of impact strength and fluidity-improved polycarbonate and composition comprising same", chemical Abstract for US2016/0251481A1, Mar. 24, 2016.

(Continued)

*Primary Examiner* — David Buttner
(74) *Attorney, Agent, or Firm* — Dentons US LLP

(57) ABSTRACT

Disclosed is a copolycarbonate including aromatic polycarbonate-based repeating units represented by Chemical Formula 1 and Chemical Formula 2; and aromatic polycarbonate-based repeating units having siloxane bonds represented by Chemical Formula 3 and Chemical Formula 4:

[Chemical Formula 1]

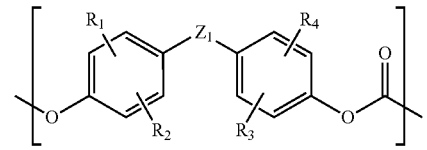

[Chemical Formula 2]

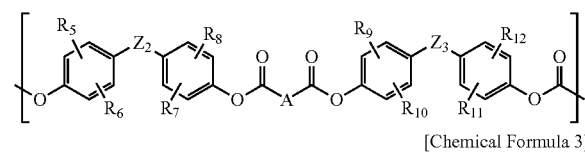

[Chemical Formula 3]

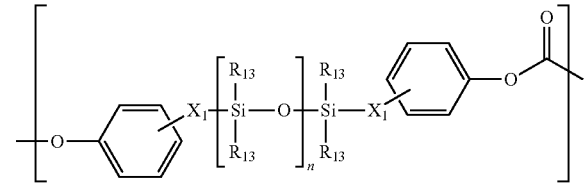

[Chemical Formula 4]

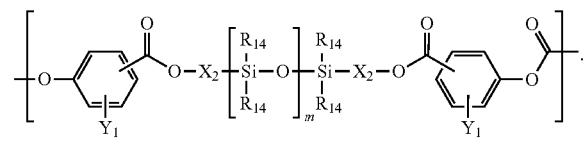

copolycarbonate provides improved impact strength at low-temperature, improved YI (yellow index), and improved melt index simultaneously.

17 Claims, No Drawings

(51) Int. Cl.
  *C08G 64/16* (2006.01)
  *C08G 64/06* (2006.01)
  *C08G 64/30* (2006.01)
  *C08G 64/08* (2006.01)
  *C08K 5/3475* (2006.01)
  *C08L 83/04* (2006.01)

(52) U.S. Cl.
  CPC ....... *C08L 2201/10* (2013.01); *C08L 2205/02* (2013.01); *C08L 2205/025* (2013.01)

(56) References Cited

U.S. PATENT DOCUMENTS

| | | | |
|---|---|---|---|
| 5,380,795 A * | 1/1995 | Gosens | C08L 51/04 525/147 |
| 5,455,310 A | 10/1995 | Hoover et al. | |
| 5,502,134 A | 3/1996 | Okamoto et al. | |
| 5,608,026 A * | 3/1997 | Hoover | C08G 77/448 528/26 |
| 5,783,651 A | 7/1998 | König et al. | |
| 5,932,677 A | 8/1999 | Hoover et al. | |
| 6,001,929 A | 12/1999 | Nodera et al. | |
| 6,252,013 B1 | 6/2001 | Banach et al. | |
| 6,281,286 B1 | 8/2001 | Chorvath et al. | |
| 6,780,956 B2 * | 8/2004 | Davis | C08G 64/085 525/464 |
| 7,135,538 B2 | 11/2006 | Glasgow et al. | |
| 7,332,559 B2 | 2/2008 | Hong et al. | |
| 7,432,327 B2 | 10/2008 | Glasgow | |
| 7,498,401 B2 | 3/2009 | Agarwal | |
| 7,524,919 B2 | 4/2009 | Hoover et al. | |
| 7,691,304 B2 | 4/2010 | Agarwal et al. | |
| 7,709,581 B2 | 5/2010 | Glasgow et al. | |
| 7,718,733 B2 | 5/2010 | Juikar et al. | |
| 8,030,379 B2 | 10/2011 | Nodera et al. | |
| 8,084,134 B2 | 12/2011 | Malinoski et al. | |
| 8,124,683 B2 | 2/2012 | Jung et al. | |
| 8,389,648 B2 | 3/2013 | Adoni et al. | |
| 8,466,249 B2 | 6/2013 | Gallucci et al. | |
| 8,552,096 B2 | 10/2013 | Li et al. | |
| 8,912,290 B2 | 12/2014 | Huggins et al. | |
| 8,933,186 B2 | 1/2015 | Bahn et al. | |
| 8,962,780 B2 | 2/2015 | Higaki et al. | |
| 8,981,017 B2 | 3/2015 | Ishikawa | |
| 9,062,164 B2 | 6/2015 | Kim et al. | |
| 9,080,021 B2 | 7/2015 | Ishikawa et al. | |
| 9,102,832 B2 | 8/2015 | Sybert et al. | |
| 9,255,179 B2 | 2/2016 | Park et al. | |
| 2003/0027905 A1 | 2/2003 | Mahood et al. | |
| 2004/0200303 A1 | 10/2004 | Inoue et al. | |
| 2006/0148986 A1 | 7/2006 | Glasgow et al. | |
| 2007/0093629 A1 | 4/2007 | Silva et al. | |
| 2007/0135569 A1 | 6/2007 | Derudder | |
| 2007/0241312 A1 | 10/2007 | Hikosaka | |
| 2007/0258412 A1 | 11/2007 | Schilling et al. | |
| 2008/0015289 A1 | 1/2008 | Siripurapu | |
| 2008/0081895 A1 | 4/2008 | Lens et al. | |
| 2008/0230751 A1 | 9/2008 | Li et al. | |
| 2009/0087761 A1 | 4/2009 | Fukushima et al. | |
| 2009/0326183 A1 | 12/2009 | Schultz et al. | |
| 2010/0233603 A1 | 9/2010 | Hikosaka | |
| 2012/0123034 A1 | 5/2012 | Morizur et al. | |
| 2012/0251750 A1 | 10/2012 | Sybert et al. | |
| 2012/0252985 A1 | 10/2012 | Rosenquist et al. | |
| 2012/0271009 A1 | 10/2012 | Higaki et al. | |
| 2012/0283393 A1 | 11/2012 | Ishikawa | |
| 2013/0003544 A1 | 1/2013 | Wermuth et al. | |
| 2013/0082222 A1 | 4/2013 | Aoki | |
| 2013/0186799 A1 | 7/2013 | Stam et al. | |
| 2013/0190425 A1 | 7/2013 | Zhu et al. | |
| 2013/0267665 A1 | 10/2013 | Huggins et al. | |
| 2013/0274392 A1 | 10/2013 | Morizur et al. | |
| 2013/0289224 A1 | 10/2013 | Bae et al. | |
| 2013/0309474 A1 | 11/2013 | Peek et al. | |
| 2013/0313493 A1 | 11/2013 | Wen et al. | |
| 2013/0317142 A1 | 11/2013 | Chen et al. | |
| 2013/0317146 A1 | 11/2013 | Li et al. | |
| 2013/0317150 A1 | 11/2013 | Wan et al. | |
| 2013/0331492 A1 | 12/2013 | Sharma | |
| 2014/0106208 A1 | 4/2014 | Ishikawa et al. | |
| 2014/0148559 A1 | 5/2014 | Kim et al. | |
| 2014/0179843 A1 | 6/2014 | Van Der Mee et al. | |
| 2014/0206802 A1 | 7/2014 | Bahn et al. | |
| 2014/0323623 A1 | 10/2014 | Miyake et al. | |
| 2015/0057423 A1 | 2/2015 | Kim et al. | |
| 2015/0175802 A1 | 6/2015 | Sybert et al. | |
| 2015/0197633 A1 | 7/2015 | Van Der Mee et al. | |
| 2015/0210854 A1 | 7/2015 | Aoki | |
| 2015/0218371 A1 | 8/2015 | Lee et al. | |
| 2015/0307706 A1 | 10/2015 | Rosenquist et al. | |
| 2015/0315380 A1 | 11/2015 | Bahn et al. | |
| 2015/0344623 A1 | 12/2015 | Park et al. | |
| 2015/0368484 A1 | 12/2015 | Shishaku et al. | |
| 2016/0002410 A1 | 1/2016 | Iyer et al. | |
| 2016/0017102 A1 | 1/2016 | Yamada | |
| 2016/0122477 A1 | 5/2016 | Rhee et al. | |
| 2016/0251481 A1 | 9/2016 | Hwang et al. | |
| 2016/0297926 A1 | 10/2016 | Hwang et al. | |
| 2016/0326312 A1 | 11/2016 | Park et al. | |
| 2016/0326313 A1 | 11/2016 | Son et al. | |
| 2016/0326314 A1 | 11/2016 | Son et al. | |
| 2016/0326321 A1 | 11/2016 | Park et al. | |
| 2016/0369047 A1 | 12/2016 | Hwang et al. | |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08234468 * | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 2015-163722 A | 9/2015 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 10-2008-0083278 A | 9/2008 |
| KR | 10-2009-0033093 A | 4/2009 |
| KR | 10-1007451 B1 | 1/2011 |
| KR | 2011-0068682 A | 6/2011 |

(56) References Cited

FOREIGN PATENT DOCUMENTS

| | | |
|---|---|---|
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 101563269 B1 | 10/2015 |
| KR | 1020150119823 A | 10/2015 |
| KR | 2015-0134457 A | 12/2015 |
| TW | 201241043 A | 10/2012 |
| WO | 2012/060516 A1 | 5/2012 |
| WO | 2013/051557 A1 | 4/2013 |
| WO | 2013-058214 A1 | 4/2013 |
| WO | 2013-073709 A1 | 5/2013 |
| WO | 2013-100606 A1 | 7/2013 |
| WO | 2013-115538 A1 | 8/2013 |
| WO | 2013/115604 A1 | 8/2013 |
| WO | 2013/175445 A2 | 11/2013 |
| WO | 2013175455 A1 | 11/2013 |
| WO | 2014/042252 A1 | 3/2014 |
| WO | 2014/058033 A1 | 4/2014 |
| WO | 2014/119827 A1 | 8/2014 |
| WO | 2014-139110 A1 | 9/2014 |
| WO | 2014/144673 A1 | 9/2014 |
| WO | 2015/011669 A2 | 1/2015 |
| WO | 2015/015445 A2 | 2/2015 |
| WO | 2015/041441 A1 | 3/2015 |
| WO | 2015/087595 A1 | 6/2015 |

OTHER PUBLICATIONS

Chemical Abstract registry No. 163617-00-3, Jun. 8, 1995.

* cited by examiner

COPOLYCARBONATE AND COMPOSITION CONTAINING THE SAME

CROSS-REFERENCE TO RELATED APPLICATION(S)

This application is a National Stage Application of International Application No. PCT/KR2015/013246, filed on Dec. 4, 2015, which claims the benefit of Korean Patent Application No. 10-2014-0173005 filed on Dec. 4, 2014 and Korean Patent Application No. 10-2015-0171768 filed on Dec. 3, 2015, all of which are hereby incorporated by reference in their entirety for all purposes as if fully set forth herein.

TECHNICAL FIELD

The present invention relates to a copolycarbonate being economically produced, and capable of improving impact strength at low temperature, YI (Yellow Index) and melt index simultaneously, and to a composition comprising the same.

BACKGROUND OF ART

Polycarbonate resins are prepared by condensation-polymerization of an aromatic diol such as bisphenol A with a carbonate precursor such as phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerizing two or more aromatic diol compounds having different structures from each other and introducing units having different structures in a main chain of the polycarbonate.

Especially, studies for introducing a polysiloxane structure in a main chain of the polycarbonate have been undergone, but most of these technologies have disadvantages in that production costs are high, and when a particular physical property is increased, the other physical properties are conversely lowered.

Given the above circumstances, the present inventors have conducted intensive studies to overcome the above-mentioned disadvantages encountered with the prior arts and develop a copolycarbonate having improved impact strength at low temperature, YI (Yellow Index) and melt index simultaneously. As a result, the inventors have found that a copolycarbonate in which a specific siloxane compound is introduced in a main chain of the polycarbonate as described below satisfies the above-described properties, thereby completing the present invention.

DETAILED DESCRIPTION OF THE INVENTION

Technical Problem

It is an object of the present invention to provide a copolycarbonate capable of improving impact strength at low temperature, YI (Yellow Index) and melt index simultaneously.

It is another object of the present invention to provide a composition comprising the above-mentioned copolycarbonate.

Technical Solution

In order to achieve the above objects, the present invention provides a copolycarbonate comprising:

i) a repeating unit represented by the following Chemical Formula 1, ii) a repeating unit represented by the following Chemical Formula 2, and iii) one or more of a repeating unit represented by the following Chemical Formula 3 and a repeating unit represented by the following Chemical Formula 4, wherein the copolycarbonate has a weight average molecular weight of 1,000 to 100,000:

[Chemical Formual 1]

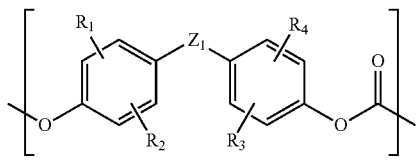

in the Chemical Formula 1, $R_1$, $R_2$, $R_3$ and $R_4$ are each independently hydrogen, $C_{1-10}$ alkyl, $C_{1-10}$ alkoxy, or halogen, and $Z_1$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Chemical Formula 2]

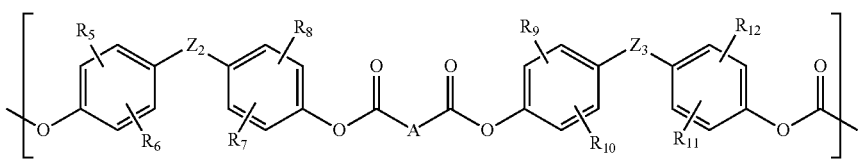

in the Chemical Formula 2, $R_5$, $R_6$, $R_7$, $R_8$, $R_9$, $R_{10}$, $R_{11}$ and $R_{12}$ are each independently hydrogen, $C_{1-10}$ alkyl, $C_{1-10}$ alkoxy, or halogen, and $Z_2$ and $Z_3$ are each independently $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO, and A is $C_{1-15}$ alkylene,

[Chemical Formula 3]

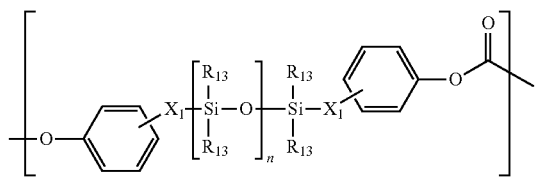

in the Chemical Formula 3,
each of $X_1$ is independently $C_{1-10}$ alkylene,
each of $R_{13}$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
n is an integer of 10 to 200,

[Chemical Formula 4]

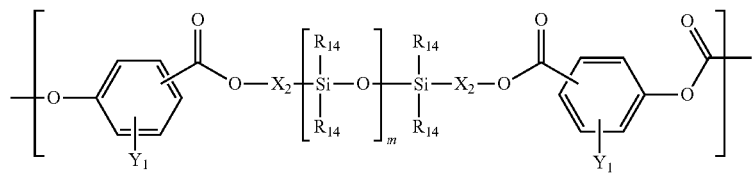

in the Chemical Formula 4,
each of $X_2$ is independently $C_{1-10}$ alkylene,
each of $Y_1$ is independently hydrogen, $C_{1-6}$ alkyl, halogen, hydroxy, $C_{1-6}$ alkoxy, or $C_{6-20}$ aryl,
each of $R_{14}$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
m is an integer of 10 to 200, The polycarbonate resin is a resin prepared by condensation-polymerization of an aromatic diol such as bisphenol A with a carbonate precursor such as phosgene and the resin itself has excellent mechanical properties, but there is a need to satisfy various physical properties simultaneously depending on the field of application. In particular, the polycarbonate resin may improve specific physical properties by changing a part of the structure, but most of them have characteristics that when any one of the physical properties is increased, the other properties are conversely lowered.

Therefore, particularly, in order to improve impact strength at low temperature, YI (Yellow Index) and melt index simultaneously, the present invention introduces the repeating unit of Chemical Formula 2 and one or more of the repeating units of the Chemical Formulae 3 and 4, in addition to the conventional polycarbonate structure comprising the repeating unit as represented by Chemical Formula 1. By introducing the repeating units as represented by Formulae 2 to 4, various physical properties of the polycarbonate can be improved without sacrificing other properties.

Hereinafter, the present invention will be described in detail.

Repeating Unit Represented by Chemical Formula 1

The repeating unit represented by Chemical Formula 1 forms a basic skeleton of the copolycarbonate resin according to the present invention, and it is formed by reacting an aromatic diol compound and a carbonate precursor.

Preferably, $R_1$, $R_3$ and $R_4$ are each independently hydrogen, methyl, chloro, or bromo.

Also, $Z_1$ is preferably a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl, or diphenylmethylene. Further, preferably, $Z_1$ is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, 'derived from aromatic diol compounds' means that a hydroxy group of the aromatic diol compound and a carbonate precursor are reacted to form the repeating unit represented by Chemical Formula 1.

For example, when bisphenol A, which is an aromatic diol compound, and triphosgene, which is a carbonate precursor, are polymerized, the repeating unit represented by Chemical Formula 1 is represented by the following Chemical Formula 1-1:

[Chemical Formula 1-1]

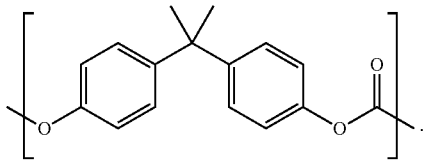

The carbonate precursor used herein may include one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene and bishaloformate. Preferably, triphosgene or phosgene may be used.

Repeating Unit Represented By Chemical Formula 2

In Chemical Formula 2, preferably, $R_5$, $R_6$, $R_7$, $R_8$, $R_9$, $R_{10}$, $R_{11}$ and $R_{12}$ are each independently hydrogen, methyl, chloro, or bromo. Further, preferably, $R_5$, $R_6$, $R_7$, $R_8$, $R_9$, $R_{10}$, $R_{11}$ and $R_{12}$ are identical to each other.

Further, preferably, $Z_2$ and $Z_3$ are each independently a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl, or diphenylmethylene. Further, preferably, $Z_2$ and $Z_3$ are cyclohexane-1,1-diyl, O, S, SO, $SO_2$, or CO. Further, preferably, $Z_2$ and $Z_3$ are identical to each other.

Further, A is preferably a linear or branched $C_{1-10}$ alkylene. Further, A is preferably a linear $C_{1-10}$ alkylene, more preferably a linear $C_{3-9}$ alkylene and most preferably octylene.

Preferably, the repeating unit represented by Chemical Formula 2 is represented by the following Chemical Formula 2-1:

[Chemical Formula 2-1]

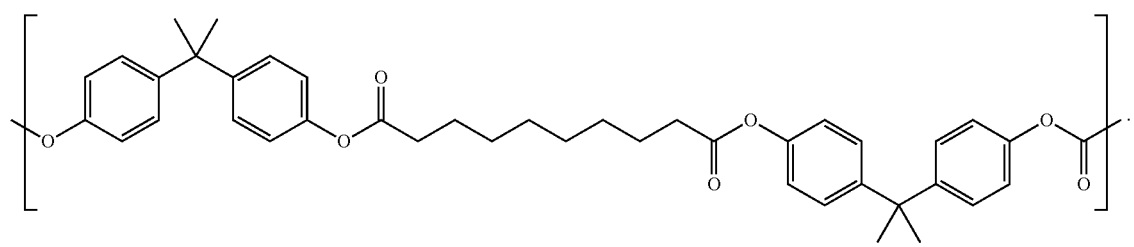

The repeating unit represented by Chemical Formula 2 is formed by reacting an aromatic diol compound represented by Chemical Formula 2-2 and a carbonate precursor:

[Chemical Formula 2-2]

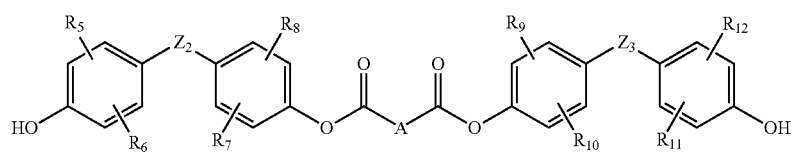

in the Chemical Formula 2-2, $R_5$, $R_6$, $R_7$, $R_8$, $R_9$, $R_{10}$, $R_{11}$, $R_{12}$, $Z_2$, $Z_3$ and A are the same as previously defined.

Further, the carbonate precursors that can be used for the formation of the repeating units represented by Chemical Formula 2 are the same as those described for the carbonate precursor that can be used for the formation of the repeating unit represented by Chemical Formula 1 described above.

The weight ratio of the repeating unit represented by Chemical Formula 1 and the repeating unit represented by Chemical Formula 2 is preferably 1:0.001 to 1:0.3, and more preferably 1:0.004 to 0.1. Within the above range, the effects of improving physical properties of the copolycarbonate is excellent. The weight ratio referred to in the above corresponds to the weight ratio of the aromatic diol compounds used for the formation of the repeating units of Chemical Formulae 1 and 2.

Repeating Units Represented By Chemical Formulae 3 and 4

The repeating units represented by Chemical Formulae 3 and 4 have a polyorganosiloxane structure, and this structure can be introduced in the copolycarbonate to improve various physical properties.

The copolycarbonate according to the present invention comprises one or more of the repeating units represented by Chemical Formula 3 and the repeating unit represented by Chemical Formula 4, and preferably it comprises all of the repeating unit represented by Chemical Formula 3 and the repeating unit represented by Chemical Formula 4.

In Chemical Formula 3, each of $X_1$ is independently preferably $C_{2-10}$ alkylene, more preferably $C_{2-4}$ alkylene, and most preferably propane-1,3-diyl.

Also, preferably, each of $R_{13}$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. In addition, each of $R_{13}$ is independently preferably $C_{1-10}$ alkyl, more preferably $C_{1-6}$ alkyl, more preferably $C_{1-3}$ alkyl and most preferably methyl.

Further, preferably, n is an integer of not less than 10, not less than 15, not less than 20, not less than 25, not less than 30, not less than 31, or not less than 32; and not more than 50, not more than 45, not more than 40, not more than 39, not more than 38, or not more than 37.

In Chemical Formula 4, each of $X_2$ is independently preferably $C_{2-10}$ alkylene, more preferably $C_{2-6}$ alkylene, and most preferably isobutylene.

Further, preferably, $Y_1$ is hydrogen.

Further, preferably, each of $R_{14}$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. Further, preferably, each of $R_{14}$ is independently $C_{1-10}$ alkyl, more preferably $C_{1-6}$ alkyl, more preferably $C_{1-3}$ alkyl, and most preferably methyl.

Preferably, m is an integer of not less than 40, not less than 45, not less than 50, not less than 55, not less than 56, not less than 57, or not less than 58; and not more than 80, not more than 75, not more than 70, not more than 65, not more than 64, not more than 63, or not more than 62.

The repeating unit represented by Chemical Formula 3 and the repeating unit represented by Chemical Formula 4 are, respectively, derived from a siloxane compound represented by the following Chemical Formula 3-1 and a siloxane compound represented by the following Chemical Formula 4-1:

[Chemical Formula 3-1]

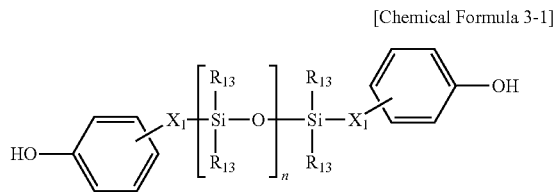

in the Chemical Formula 3-1,
$X_1$, $R_{13}$ and n are the same as previously defined.

[Chemical Formula 4-1]

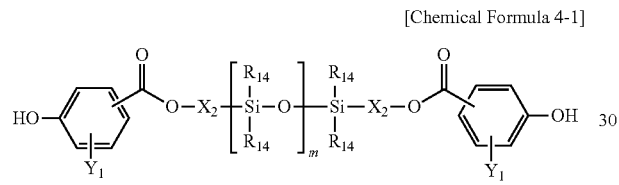

in the Chemical Formula 4-1,
$X_2$, $Y_1$, $R_{14}$ and m are the same as previously defined.

As used herein, 'derived from a siloxane compound' means that a hydroxy group of the respective siloxane compound and a carbonate precursor are reacted to form the repeating unit represented by Chemical Formula 3 and the repeating unit represented by Chemical Formula 4. Further, the carbonate precursors that can be used for the formation of the repeating units represented by Chemical Formulae 3 and 4 are the same as those described for the carbonate precursor that can be used for the formation of the repeating unit represented by Chemical Formula 1 described above.

The methods for preparing the siloxane compound represented by Chemical Formula 3-1 and the siloxane compound represented by Chemical Formula 4-1 are represented by the following Reaction Schemes 1 and 2, respectively:

[Reaction Scheme 1]

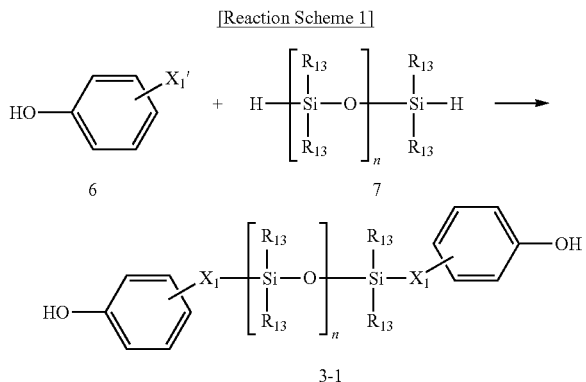

in the Reaction Scheme 1,
$X_1'$ is $C_{2-10}$ alkenyl, and
$X_1$, $R_{13}$ and n are the same as previously defined.

[Reaction Scheme 2]

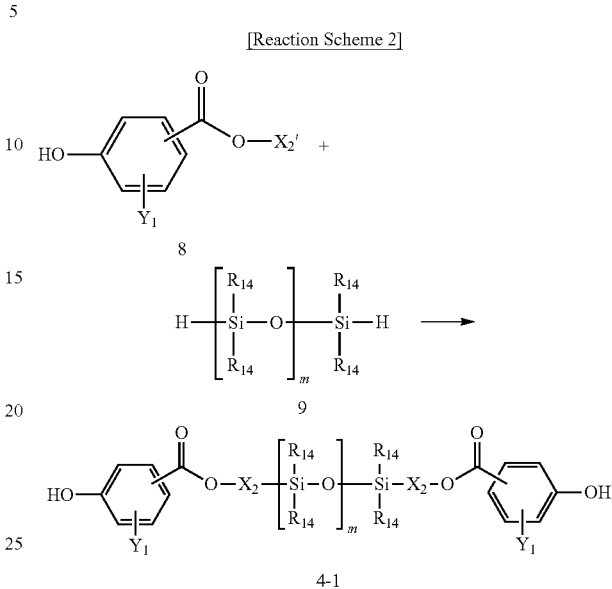

in the Reaction Scheme 2,
$X_2'$ is $C_{2-10}$ alkenyl, and
$X_2$, $Y_1$, $R_{14}$ and m are the same as previously defined.

In Reaction Scheme 1 and Reaction Scheme 2, the reaction is preferably conducted in the presence of a metal catalyst. As the metal catalyst, a Pt catalyst is preferably used. The Pt catalyst used herein may include one or more selected from the group consisting of Ashby catalyst, Karstedt catalyst, Lamoreaux catalyst, Speier catalyst, $PtCl_2$ (COD), $PtCl_2$(benzonitrile)$_2$ and $H_2PtBr_6$. The metal catalyst may be used in an amount of not less than 0.001 parts by weight, not less than 0.005 parts by weight, or not less than 0.01 parts by weight; and not more than 1 part by weight, not more than 0.1 part by weight, or not more than 0.05 part by weight, based on 100 parts by weight of the compounds represented by the Chemical Formulae 7 or 9.

Further, the above reaction temperature is preferably 80 to 100° C. Further, the above reaction time is preferably 1 to 5 hours.

In addition, the compounds represented by Chemical Formulae 7 or 9 can be prepared by reacting an organodisiloxane and an organocyclosiloxane in the presence of an acid catalyst, and n and m may be adjusted by adjusting the amount of the reactants used. The reaction temperature is preferably 50 to 70° C. Also, the reaction time is preferably 1 to 6 hours.

The above organodisiloxane may include one or more selected from the group consisting of tetramethyldisiloxane, tetraphenyldisiloxane, hexamethyldisiloxane and hexaphenyldisiloxane. In addition, the above organocyclosiloxane may include, for example, organocyclotetrasiloxane. As one example thereof, octamethylcyclotetrasiloxane, octaphenylcyclotetrasiloxane and the like can be included.

The above organodisiloxane can be used in an amount of not less than 0.1 parts by weight, or not less than 2 parts by weight; and not more than 10 parts by weight or not more than 8 parts by weight, based on 100 parts by weight of the organocyclosiloxane.

The above acid catalyst that may be used herein includes one or more selected from the group consisting of $H_2SO_4$, $HClO_4$, $AlCl_3$, $SbCl_5$, $SnCl_4$ and acid clay (fuller's earth). Further, the acid catalyst may be used in an amount of not less than 0.1 parts by weight, not less than 0.5 parts by weight, or not less than 1 part by weight; and not more than 10 parts by weight, not more than 5 parts by weight or not more than 3 parts by weight, based on 100 parts by weight of the organocyclosiloxane.

When the copolycarbonate according to the present invention comprises all of the repeating unit represented by Chemical Formula 3 and the repeating unit represented by Chemical Formula 4, the content of the rerpective repeating units can be adjusted to improve various physical properties of the copolycarbonate simultaneously. The weight ratio between the above repeating units may be from 1:99 to 99:1. Preferably, the weight ratio is from 3:97 to 97:3, from 5:95 to 95:5, from 10:90 to 90:10, or from 15:85 to 85:15, and more preferably from 20:80 to 80:20. The weight ratio of the above repeating units corresponds to the weight ratio of siloxane compounds, for example the siloxane compound represented by Chemical Formula 3-1 and the siloxane compound represented by Chemical Formula 4-1.

Preferably, the repeating unit represented by Chemical Formula 3 is represented by the following Chemical Formula 3-2:

[Chemical Formula 3-2]

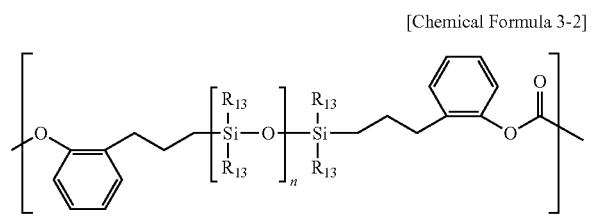

in the Chemical Formula 3-2, $R_{13}$ and n are the same as previously defined. Preferably, $R_{13}$ is methyl.

Also, preferably, the repeating unit represented by Chemical Formula 4 is represented by the following Chemical Formula 4-2:

[Chemical Formula 4-2]

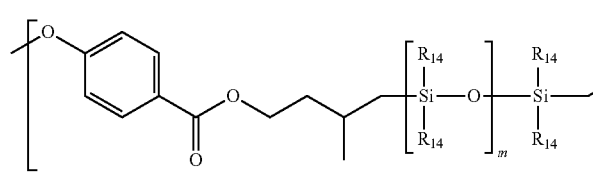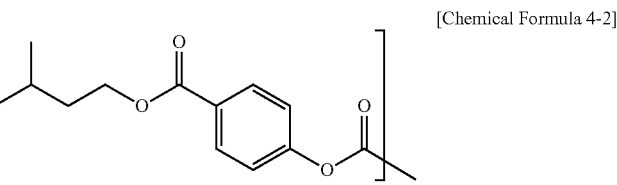

in the Chemical Formula 4-2, $R_{14}$ and m are the same as previously defined. Preferably, $R_{14}$ is methyl.

Preferably, the weight ratio between the weight of the repeating unit represented by Chemical Formula 1, and the total weight of one or more of the repeating unit represented by Chemical Formula 3 and the repeating unit represented by Chemical Formula 4 (Chemical Formula 1: (Chemical Formula 3 and/or Chemical Formula 4)) is 1:0.001 to 1:0.2, and more preferably 1:0.01 to 1:0.1. The weight ratio of the repeating units corresponds to the weight ratio of the aromatic diol compound used in the formation of the repeating unit of Chemical Formula 1 and the siloxane compound used in the formation of the repeating units of Formulae 3 and 4.

Copolycarbonate

The copolycarbonate according to the present invention comprises i) a repeating unit represented by the Chemical Formula 1, ii) a repeating unit represented by the Chemical Formula 2, and iii) one or more of a repeating unit represented by the Chemical Formula 3 and a repeating unit represented by the Chemical Formula 4. Preferably, the copolycarbonate is a random copolymer.

The copolycarbonate according to the present invention can be prepared by a preparation method comprising a step of polymerizing two kinds of aromatic diol compounds, the carbonate precursor and one or more kinds of siloxane compounds.

The aromatic diol compound, the carbonate precursor and the siloxane compounds are the same as previously described.

During the polymerization, the siloxane compounds can be used in an amount of not less than 0.1% by weight, not less than 0.5% by weight, not less than 1% by weight, or not less than 1.5% by weight; and not more than 20% by weight, not more than 10% by weight, not more than 7% by weight, not more than 5% by weight, not more than 4% by weight, not more than 3% by weight or not more than 2% by weight, based on 100% by weight in total of the two kinds of aromatic diol compounds, the carbonate precursor and the siloxane compounds.

Also, the above two kinds of aromatic diol compounds may be used in an amount of not less than 40% by weight, not less than 50% by weight, or not less than 55% by weight; and not more than 80% by weight, not more than 70% by weight, or not more than 65% by weight, based on 100% by weight in total of the two kinds of aromatic diol compounds, the carbonate precursor and the siloxane compounds.

The above carbonate precursor may be used in an amount of not less than 10% by weight, not less than 20% by weight, or not less than 30% by weight; and not more than 60% by weight, not more than 50% by weight, or not more than 40(Ya by weight, based on 100% by weight in total of the two kinds of aromatic diol compounds, the carbonate precursor and the siloxane compounds.

Further, as the polymerization method, an interfacial polymerization method can be used as one example. In this case, there is an effect in that the polymerization reaction can be made at low temperature and atmospheric pressure and it is easy to control the molecular weight. The above interfacial polymerization is preferably conducted in the presence of an acid binder and an organic solvent. Furthermore, the above interfacial polymerization may comprise, for example, the steps of conducting pre-polymerization, then adding a coupling agent and again conducting polymerization. In this case, the copolycarbonate having a high molecular weight can be obtained.

The materials used in the interfacial polymerization are not particularly limited as long as they can be used in the polymerization of polycarbonates. The used amount thereof may be controlled as required.

The acid binding agent may include, for example, alkali metal hydroxides such as sodium hydroxide or potassium hydroxide, or amine compounds such as pyridine.

The organic solvent is not particularly limited as long as it is a solvent that can be usually used in the polymerization of polycarbonate. As one example, halogenated hydrocarbon such as methylene chloride or chlorobenzene may be used.

Further, during the interfacial polymerization, a reaction accelerator, for example, a tertiary amine compound such as triethylamine, tetra-n-butyl ammonium bromide and tetra-n-butylphosphonium bromide or a quaternary ammonium compound or a quaternary phosphonium compound may be further used for accelerating the reaction.

In the interfacial polymerization, the reaction temperature is preferably from 0 to 40° C. and the reaction time is preferably from 10 minutes to 5 hours. Further, during the interfacial polymerization reaction, pH is preferably maintained at 9 or more, or 11 or more.

In addition, the interfacial polymerization may be conducted by further including a molecular weight modifier. The molecular weight modifier may be added before the initiation of polymerization, during the initiation of polymerization, or after the initiation of polymerization.

As the above molecular weight modifier, mono-alkylphenol may be used. As one example, the mono-alkylphenol is one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol, and preferably p-tert-butylphenol. In this case, the effect of adjusting the molecular weight is great.

The above molecular weight modifier is contained, for example, in an amount of not less than 0.01 parts by weight, not less than 0.1 parts by weight, or not less than 1 part by weight; and not more than 10 parts by weight, not more than 6 parts by weight, or not more than 5 parts by weight, based on 100 parts by weight of the aromatic diol compound. Within this range, the required molecular weight can be obtained.

Preferably, the copolycarbonate according to the present invention has a weight average molecular weight (g/mol) of 1,000 to 100,000. More preferably, the above weight average molecular weight (g/mol) is not less than 15,000, not less than 16,000, not less than 17,000, not less than 18,000, not less than 19,000, not less than 20,000, not less than 21,000, not less than 22,000, not less than 23,000, not less than 24,000, or not less than 25,000; and not more than 40,000, not more than 39,000, not more than 38,000, not more than 37,000, not not more than 36,000, not not more than 35,000, or not more than 34,000.

Further, preferably, the copolycarbonate according to the present invention has an impact strength at room temperature of 700 to 1100 J/m as measured at 23° C. in accordance with ASTM D256 (⅛ inch, Notched Izod). More preferably, the impact strength at room temperature (J/m) is not less than 750, not less than 800, or not less than 850. Further, the impact strength at room temperature (J/m) is more excellent when the value is higher, and thus it is not limited to any upper limit. As one example, however, it may be not more than 1050, or not more than 1000.

Preferably, the copolycarbonate according to the present invention has impact strength at low temperature of 600 to 1000 Jim as measured at −30° C. in accordance with ASTM D256 (⅛ inch, Notched Izod). More preferably, the impact strength at low-temperature (J/m) is not less than 650, not less than 700, not less than 750, not less than 800, not less than 850, not less than 900, not less than 950. In addition, the impact strength at low temperature (J/m) is more excellent when the value is higher, and thus it is not limited to any upper limit. As one example, however, it may be not more than 990, or not more than 980.

Preferably, the copolycarbonate according to the present invention has YI (Yellow Index) of not more than 2 as measured in accordance with ASTM D1925. More preferably, YI (Yellow Index) is not more than 1.9, or not more than 1.8, and more than 0.

Further, preferably, the copolycarbonate according to the present invention has a melt index of 5 to 20 g/10 min as measured in accordance with ASTM D1238 (conditions of 300° C. and 1.2 kg). More preferably, the melt index (g/10 min) is not less than 6, not less than 7, or not less than 8; and not more than 19, not more than 18, not more than 17, not more than 16, not more than 15, or not more than 14.

In addition, the present invention provides a polycarbonate composition comprising the above-mentioned copolycarbonate and polycarbonate.

The copolycarbonate may be used alone, but also may be used together with the polycarbonate as needed to control the physical properties of the copolycarbonate.

The above polycarbonate is dinstiguished from the copolycarbonate according to the present invention in that a polysiloxane structure is not introduced in a main chain of the polycarbonate.

Preferably, the above polycarbonate comprises a repeating unit represented by the following Chemical Formula 5:

[Chemical Formula 5]

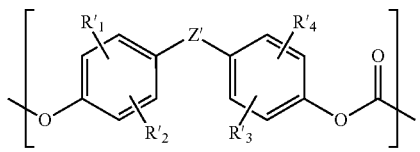

in the Chemical Formula 5, $R'_1$, $R'_2$, $R'_3$ and $R'_4$ are each independently hydrogen, $C_{1-10}$ alkyl, $C_{1-10}$ alkoxy, or halogen, and Z' is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

Further, preferably, the above polycarbonate has a weight average molecular weight of 15,000 to 35,000 g/mol. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the above weight average molecular weight (g/mol) is not more than 34,000, not more than 33,000, or not more than 32,000.

The repeating unit represented by Chemical Formula 5 is formed by reacting the aromatic diol compound and the carbonate precursor. The aromatic diol compound and the carbonate precursor that can be used herein are the same as previously described for the repeating unit represented by Chemical Formula 1.

Preferably, $R'_1$, $R'_2$, $R'_3$, $R'_4$ and Z' in Chemical Formula 5 are the same as previously described for $R_1$, $R_2$, $R_3$, $R_4$ and Z in Chemical Formula 1, respectively.

Further, preferably, the repeating unit represented by Chemical

Formula 5 is represented by the following Chemical Formula 5-1:

[Chemical Formula 5-1]

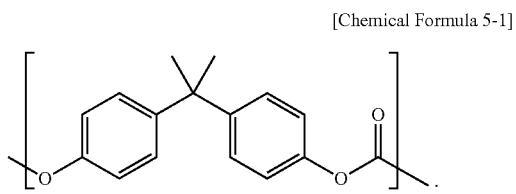

In the polycarbonate composition, the weight ratio of the copolycarbonate and the polycarbonate is preferably from 99:1 to 1:99, more preferably from 90:10 to 50:50, and most preferably from 80:20 to 60:40.

In addition, the present invention provides an article comprising the above-mentioned copolycarbonate or the copolycarbonate composition.

Preferably, the above article is an injection molded article. In addition, the article may further comprise, for example, one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes.

The method for preparing the article may comprise the steps of mixing the copolycarbonate according to the present invention and additives such as antioxidants using a mixer, extrusion-molding the mixture with an extruder to produce a pellet, drying the pellet and then injecting the dried pellet with an injection molding machine.

Advantageous Effects

As set forth above, since the copolycarbonate according to the present invention introduces a particular structure, it has effects of improving impact strength at low temperature, YI (Yellow Index) and MI (melt index) simultaneously.

DETAILED DESCRIPTION OF THE EMBODIMENTS

Below, preferred embodiments will be provided in order to assist in the understanding of the present disclosure. However, these examples are provided only for illustration of the present invention, and should not be construed as limiting the present invention to these examples.

Preparation Example 1: Preparation of Polyorganosiloxane (AP-30)

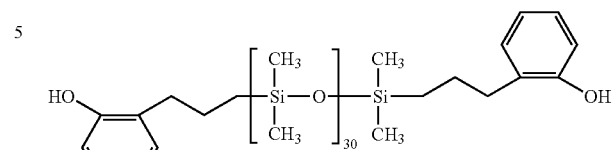

42.5 g (142.8 mmol) of octamethylcyclotetrasiloxane and 2.26 g (16.8 mmol) of tetramethyldisiloxane were mixed. The mixture was then placed in 3 L flask together with 1 part by weight of an acid clay (DC-A3) relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the unmodified polyorganosiloxane thus prepared was 30 when confirmed through $^1$H NMR.

To the resulting terminal-unmodified polyorganosiloxane, 9.57 g (71.3 mmol) of 2-allylphenol and 0.01 g (50 ppm) of Karstedt's platinum catalyst were added and reacted at 90° C. for 3 hours. After completion of the reaction, the unreacted polyorganosiloxane was removed by conducting evaporation under the conditions of 120° C. and 1 torr. The terminal-modified polyorganosiloxane thus prepared was designated as 'AP-30'. AP-30 was pale yellow oil and the repeating unit (n) was 30 when confirmed through $^1$H NMR using a Varian 500 MHz and further purification was not required.

Preparation Example 2: Preparation of Polyorganosiloxane (MB-60)

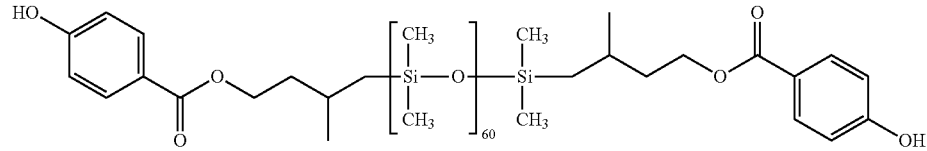

47.60 g (160 mmol) of octamethylcyclotetrasiloxane and 1.5 g (11 mmol) of tetramethyldisiloxane were mixed. The mixture was then introduced in 3 L flask together with 1 part by weight of an acid clay (DC-A3) relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (m) of the terminal-unmodified polyorganosiloxane thus prepared was 60 when confirmed through $^1$H NMR.

To the resulting terminal-unmodified polyorganosiloxane, 6.13 g (29.7 mmol) of 3-methylbut-3-enyl 4-hydroxybenzoate and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as 'MB-60'. MB-60 was pale yellow oil, the repeating unit (m) was 60 when confirmed through $^1$H NMR using a Varian 500 MHz and further purification was not required.

Example 1

978.4 g of Bisphenol A (BPA), 3.927 g of BPDA (bis(4-(2-(4-hydroxyphenyl)propan-2-yl)phenyl) decanedioate), 1,620 g of NaOH 32% aqueous solution, and 7,500 g of distilled water were added to 20 L glass reactor. After confirming that BPA was completely dissolved under nitrogen atmosphere, 3,670 g of methylene chloride, 17.9 g of p-tert-butylphenol (PTBP), and 44.028 g of polyorganosiloxane previously prepared and 4.892 g of polyorganosiloxane (MB-60) of Preparation Example 2 were added and mixed. To this mixture, 3,850 g of methylene chloride in which 542.5 g of triphosgene was dissolved was added dropwise for one hour. At this time, a NaOH aqueous solution was maintained at pH 12. After completion of the dropwise addition, the reaction product was aged for 15 minutes, and 195.7 g of triethylamine was dissolved in methylene chloride and added. Alter 10 minutes, pH was adjusted to 3 with 1N aqueous hydrochloric acid solution and then washed three times with distilled water. Subsequently, the methylene chloride phase was separated, and then precipitated in methanol to give a copolycarbonate resin in the form of a powder.

Examples 2 to 6 and Comparative Examples 1 to 4

The copolycarbonate were prepared by the same method as in Example 1, except that the reaction materials were used in the content as shown in Table 1 below.

TABLE 1

| | BPA(g) | BPDA(g) | AP-30(g) | MB-60(g) |
|---|---|---|---|---|
| Example 1 | 978.4 | 3.927 | 44.028 | 4.892 |
| Example 2 | 974.4 | 14.66 | 43.848 | 4.872 |
| Example 3 | 961.8 | 48.17 | 43.281 | 4.809 |
| Example 4 | 974.4 | 14.66 | 46.284 | 2.436 |
| Example 5[1)] | 974.4 | 14.66 | 43.281 | 4.809 |
| Example 6 | 974.4 | 14.66 | 43.848 | 4.872 |
| Comparative Example 1 | 979.9 | — | — | — |
| Comparative Example 2 | 961.8 | — | 41.031 | 4.559 |
| Comparative Example 3 | 969.0 | 29.06 | — | — |
| Comparative Example 4 | 979.9 | — | 48.995 | — |

[1)]31.92 g of PTBP was used

Experimental Example: Confirmation of Characteristics of Copolycarbonate

The weight average molecular weight of the copolycarobates prepared in the examples and comparative examples were measured by GPC using PC Standard with Agilent 1200 series.

In addition, with respect to 1 part by weight of the respective copolycarbonates prepared in the examples and comparative examples, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritol tetrastearate were added thereto, and the resulting mixture was pelletized using a Φ30 mm twin-screw extruder provided with a vent, and was injection-molded at a cylinder temperature of 300° C. and a mold temperature of 80° C. using an injection molding machine N-20C (manufactured by JSW, Ltd.) to prepare a desired specimen.

The characteristics of the above specimens were determined by the following method and the results were shown in Table 2 below.

1) Impact strength at room temperature: measured at 23° C. in accordance with ASTM 0256 (⅛ inch, Notched Izod).

2) Impact strength at low temperature: measured at −30° C. in accordance with ASTM D256 (⅛ inch, Notched Izod).

3) YI (Yellow Index): A specimen (width/length/thickness=60 mm/40 mm/3 mm) was prepared by injection molding and YI (Yellow Index) was measured using Color-Eye 7000A (manufactured by X-Rite Ltd.) in accordance with ASTM 01925. The measurement condition was as follows.

Measurement temperature: room temperature (23° C.)
Aperture size: Large area of view
Measurement method: transmittance was measured in a spectral range (360 nm to 750 nm).

4) Melt index (MI): measured in accordance with ASTM 01238 (conditions of 300° C. and 1.2 kg).

TABLE 2

| | Mw (g/mol) | Impact strength at room temperature (J/m) | Impact strength at low temperature (J/m) | YI | MI (g/10 min) |
|---|---|---|---|---|---|
| Example 1 | 34000 | 1000 | 980 | 1.79 | 6.1 |
| Example 2 | 34000 | 960 | 924 | 1.78 | 7.5 |
| Example 3 | 34000 | 890 | 830 | 1.75 | 13.2 |
| Example 4 | 34000 | 840 | 635 | 1.76 | 7.2 |
| Example 5 | 27000 | 780 | 600 | 1.69 | 19.3 |
| Example 6 | 34000 | 834 | 685 | 1.79 | 8.3 |
| Comparative Example 1 | 34000 | 950 | 190 | 1.75 | 5.7 |
| Comparative Example 2 | 34000 | 1090 | 980 | 5.9 | 4.1 |
| Comparative Example 3 | 34000 | 820 | 230 | 0.93 | 14.4 |
| Comparative Example 4 | 34000 | 890 | 484 | 5.3 | 4.2 |

The invention claimed is:

1. A copolycarbonate comprising:
   i) a repeating unit represented by the following Chemical Formula 1, ii) a repeating unit represented by the following Chemical Formula 2, iii) a repeating unit represented by the following Chemical Formula 3, and iv) a repeating unit represented by the following Chemical Formula 4,
   wherein the copolycarbonate has a weight average molecular weight of 1,000 to 100,000:

[Chemical Formula 1]

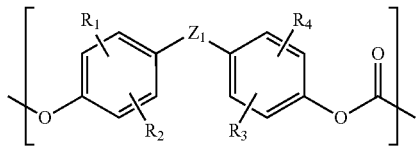

in the Chemical Formula 1,
$R_1$, $R_2$, $R_3$ and $R_4$ are each independently hydrogen, $C_{1-10}$ alkyl, $C_{1-10}$ alkoxy, or halogen, and $Z_1$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Chemical Formula 2]

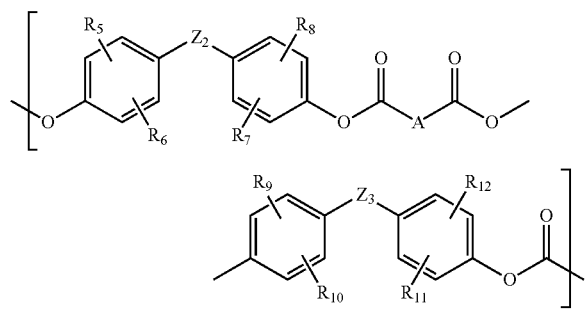

in the Chemical Formula 2, $R_5$, $R_6$, $R_7$, $R_8$, $R_9$, $R_{10}$, $R_{11}$, and $R_{12}$ are each independently hydrogen, $C_{1-10}$ alkyl, $C_{1-10}$ alkoxy, or halogen, and $Z_2$ and $Z_3$ are each independently $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO, and A is $C_{1-15}$ alkylene,

[Chemical Formula 3]

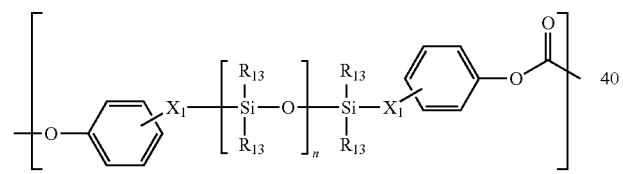

in the Chemical Formula 3, each of $X_1$ is independently $C_{1-10}$ alkylene, each of $R_{13}$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 10 to 200,

[Chemical Formula 4]

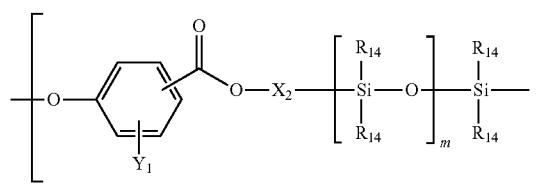

-continued

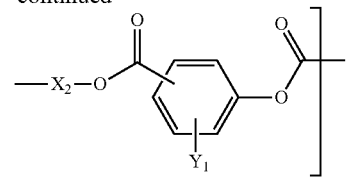

in the Chemical Formula 4, each of $X_2$ is independently $C_{1-10}$ alkylene, each of $Y_1$ is independently hydrogen, $C_{1-6}$ alkyl, halogen, hydroxy, $C_{1-6}$ alkoxy, or $C_{6-20}$ aryl, each of $R_{14}$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 10 to 200.

2. The copolycarbonate of claim 1, wherein the repeating unit represented by Chemical Formula 1 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane and bis(4-hydroxyphenyl)diphenylmethane.

3. The copolycarbonate of claim 1, wherein the repeating unit represented by Chemical Formula 1 is represented by the following Chemical Formula 1-1:

[Chemical Formula 1-1]

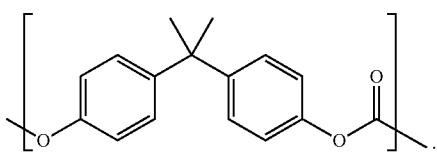

4. The copolycarbonate of claim 1, wherein $R_5$, $R_6$, $R_7$, $R_8$, $R_9$, $R_{10}$, $R_{11}$ and $R_{12}$ are each independently hydrogen, methyl, chloro, or bromo.

5. The copolycarbonate of claim 1, wherein $Z_2$ and $Z_3$ are each independently a linear or brached $C_{1-10}$ alkylene unsubstituted or substituted with phenyl, cyclohexane-1,1-diyl, O, S, SO, $SO_2$, or CO.

6. The copolycarbonate of claim 1, wherein

A is a linear $C_{1-10}$ alkylene.

7. The copolycarbonate of claim 1, wherein the repeating unit represented by Chemical Formula 2 is represented by the following Chemical Formula 2-1:

[Chemical Formula 2-1]

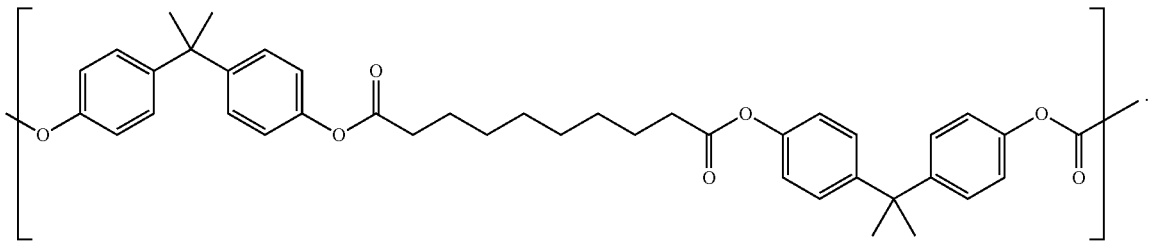

8. The copolycarbonate of claim 1, wherein
the weight ratio of the repeating unit represented by Chemical Formula 1 and the repeating unit represented by Chemical Formula 2 is 1:0.001 to 1:0.3.

9. The copolycarbonate of claim 1, wherein
the weight ratio between the weight of the repeating unit represented by Chemical Formula 1 and the total weight of one or more of the repeating unit represented by Chemical Formula 3 and the repeating unit represented by Chemical Formula 4 is 1:0.001 to 1:0.1.

10. The copolycarbonate of claim 1, wherein
the repeating unit represented by Chemical Formula 3 is represented by the following Chemical Formula 3-2:

[Chemical Formula 3-2]

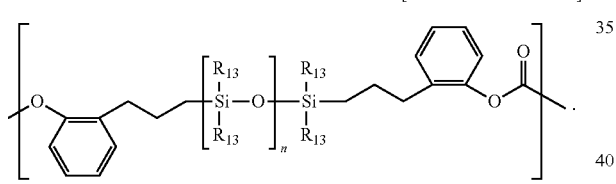

11. The copolycarbonate of claim 10, wherein
$R_{13}$ is methyl.

12. The copolycarbonate of claim 1, wherein
the repeating unit represented by Chemical Formula 4 is represented by the following Chemical Formula 4-2:

[Chemical Formula 4-2]

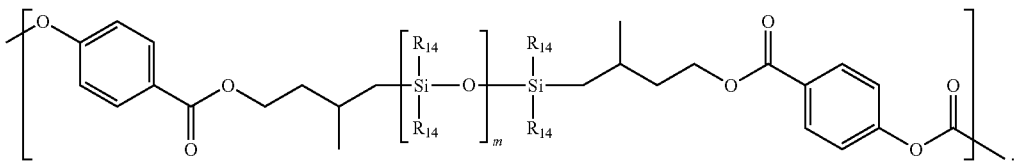

13. The copolycarbonate of claim 12, wherein
$R_{14}$ is methyl.

14. The copolycarbonate of claim 1, wherein
the copolycarbonate has a weight average molecular weight of 15,000 to 40,000 g/mol.

15. A polycarbonate composition comprising the copolycarbobnate of claim 1, and a polycarbonate.

16. The polycarbonate composition of claim 15, wherein
a polysiloxane structure is not introduced in a main chain of the polycarbonate.

17. The polycarbonate composition of claim 15, wherein
the above polycarbonate comprises a repeating unit represented by the following Chemical Formula 5:

[Chemical Formula 5]

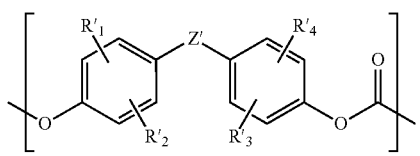

in the Chemical Formula 5, $R'_1$, $R'_2$, $R'_3$ and $R'_4$ are each independently hydrogen, $C_{1-10}$ alkyl, $C_{1-10}$ alkoxy, or halogen, and $Z'$ is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

* * * * *